Oct. 22, 1935.  H. E. MORTON  2,018,185
CUTTER BAR FOR KEY SEATERS
Filed Nov. 9, 1934
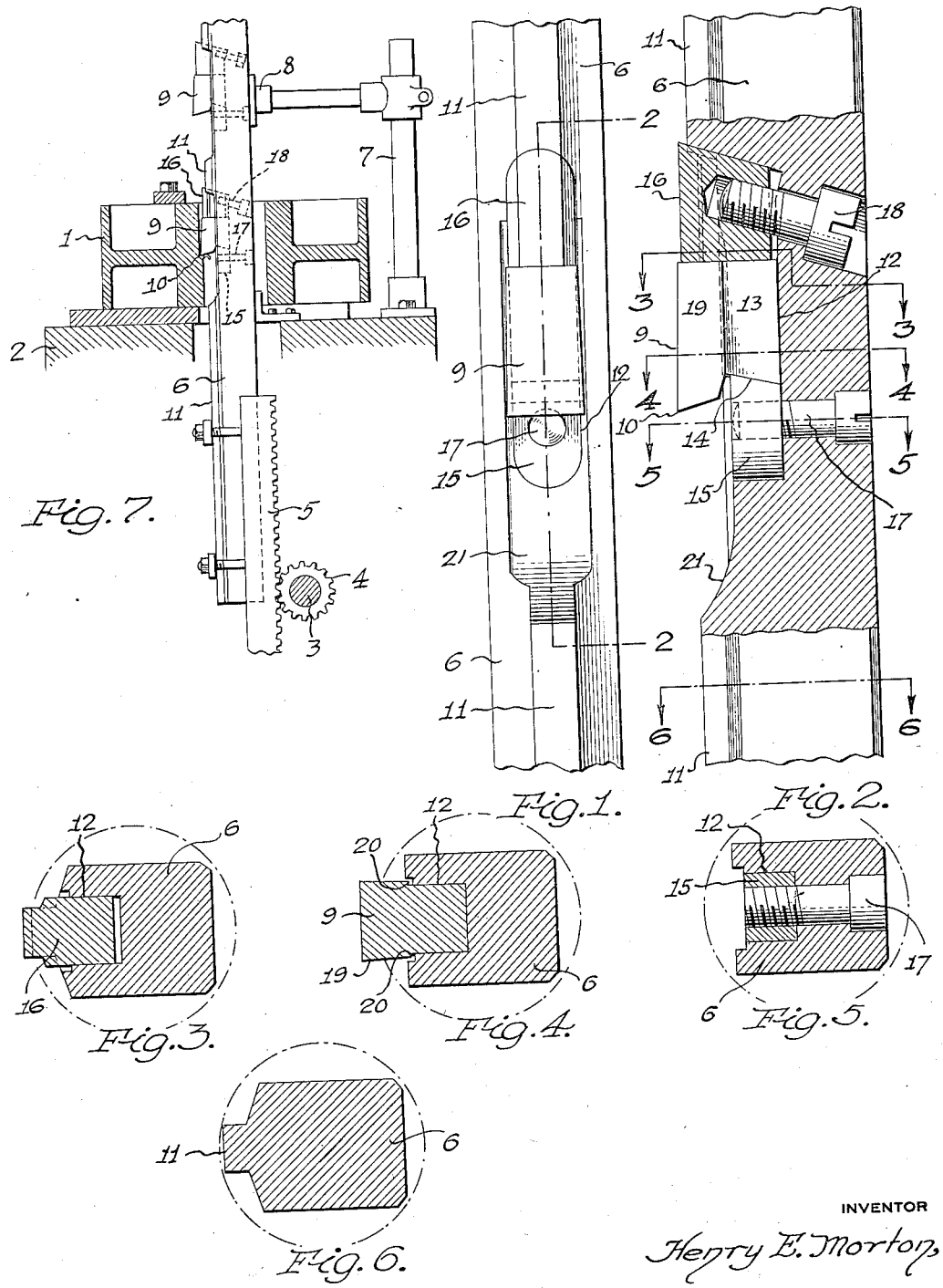
INVENTOR
Henry E. Morton,
BY
ATTORNEYS Patented Oct. 22, 1935

2,018,185

UNITED STATES PATENT OFFICE 2,018,185

CUTTER BAR FOR KEY SEATERS

Henry E. Morton, Muskegon Heights, Mich.

Application November 9, 1934, Serial No. 752,309

4 Claims. (Cl. 29—97)

This invention relates to a key-seat forming machine and more particularly to a cutter bar and cutting tool for such machines and the manner of mounting such tool upon the bar.

An object of the invention is to so construct a cutter bar for the purpose, and so mount a cutting tool thereon, as to provide, in a bar of minimum cross-sectional area, the maximum strength and to provide a simple construction of bar and tool mounting whereby cheapness and facility of manufacture are secured. A further object is to provide simple and efficient means for mounting a cutting tool or tools upon the bar, and whereby the tool will be held with maximum rigidity to prevent chattering or vibration during the working stroke, and will be so held without the necessity for excessive cutting away and consequent weakening of the bar, and to provide securing means for the tool or tools, located wholly within the area of the bar and so arranged that a plurality of such tools may be mounted in series upon a single bar and each tool be individually held without interference with the holding means for the other tools, and each may be readily detached for the purpose of replacement or repair. It is also an object to provide a tool of a form to minimize cost of manufacture and material, and to adapt the same for seating within a recess in the bar with its cutting point projecting a minimum distance therefrom, and to provide simple means for seating within such recess and for rigidly holding the tool in a manner to relieve the same from stresses and strains to the maximum extent.

With the above and other ends in view, the invention consists in the matters hereinafter set forth and more particularly pointed out in the appended claims, reference being had to the accompanying drawing wherein:

Figure 1 is a side elevation of a portion of a cutter bar showing a cutting tool and holding means therefor mounted thereon, and illustrative of an embodiment of the present invention;

Fig. 2 is a central longitudinal section upon the line 2—2 of Fig. 1;

Figs. 3, 4, 5 and 6 are cross sections upon the lines 3—3, 4—4, 5—5 and 6—6, respectively, of Fig. 2; and Fig. 7 is a view illustrative of an application of the invention in use.

The present invention relates to a tool carrying bar reciprocable within a bore to cut a key seat in the wall of the bore, such as the bore of the hub of a pulley 1, as illustrated in Fig. 7, but it will be understood that such showing is merely illustrative of an application of the invention in use and that the same is applicable to the forming of a key seat in the bore of any other device adapted to be secured in place upon the table or other support 2 of a machine provided with driving means, such as a shaft 3 having a gear 4 to engage a rack bar 5 and adapted to be detachably secured in any suitable manner to the lower end of the cutter bar 6 for reciprocating said bar vertically through an opening in said table and through the bore of the hub of the pulley 1 supported upon said table. Any other form of machine than that shown in Fig. 7, suited to the work in hand, may be employed to reciprocate the cutter bar within the bore of the work, the machine shown, being merely illustrative of means for the purpose, this machine, as shown, being provided with a post or standard 7 forming a support for a backing member 8 to engage the back side face of the bar 6 and take the side thrust upon the bar above the table, imposed thereon by the cutting tool or tools 9 projecting from the opposite face, in cutting the key seat in the wall of the bore of the work.

When the bore, in the wall of which the key seat is to be formed, is of comparatively small diameter, the cutter bar 6 must be comparatively small in cross section in order to pass freely through this bore, and where the bore is of larger diameter, the cut to be made in forming the key seat is proportionately heavy, therefore, in either case, the cutter bar should be as large in cross section as possible and yet pass freely through the bore, and if the bar be materially weakened by the manner of mounting and securing the cutting tool thereon, it may yield, destroying the accuracy of the cut or, under very heavy strain, may be broken. Further the way or position of mounting of the tool may increase the strain on the bar excessively, and a feature of the present invention is to so mount the tool, that in operation, it will not exert undue leverage tending to spring the bar.

If found desirable, the bar 6 may be provided with a plurality of tools 9 spaced apart in the direction of the length of the bar as shown in Fig. 7, each tool being set or formed so that its cutting point or lower end edge 10 will project a greater distance laterally from the bar than the cutting edge of the preceding tool in the direction of the working stroke of the bar, and therefore each tool will make its individual cut, and together the tools may be arranged to cut the full depth of the key seat to be formed, with a single down stroke of the bar. Where a single tool is employed or where a lesser number is used than is sufficient to make the full depth of cut upon a single stroke of the bar, the machine will be provided with means (not shown) for moving the bar laterally to advance the tool or tools toward the work at the beginning of each working stroke.

In order to provide the maximum cross sectional area and strength for the bar 6, it is formed with a cross section just slightly less than the diameter of the bore in which it is to reciprocate, and where the bar is to be moved laterally to advance the tool or tools and to give clearance upon the return stroke, further clearance for the bar within the bore must be provided to provide for such lateral movement, but in either case the bar is preferably formed throughout its length with a longitudinal rib 11 at the side edge thereof from which the tool or tools project, to add strength to the bar, and this rib is preferably of slightly less width than the width of the key seat being formed, so that it may enter the key seat groove as the cut is advanced in progressively forming such groove.

To form a seat of extended length for each tool 9 in the ribbed side edge of the bar 6, said bar is formed with a recess or slot 12 for each tool, which tool is formed with an inner side tongue 13 extending the length of the tool to fit closely within the inner or bottom portion of said recess, and the lower end of this tongue on the tool, is formed at an incline to the flat inner side surface of the tongue which seats firmly throughout its length upon the inner or bottom surface of the recess 12, said end surface 14 of said tongue being inclined inwardly and downwardly of the recess, to be engaged by a locking block 15 which is formed with a correspondingly inclined upper end surface to seat against the end surface of the tongue and firmly lock the tool within said recess between said block and a wedge block 16, said block being held in the lower end of the recess by a screw 17 passing through a transverse opening in the bar with its head exposed at the rear side of the bar and countersunk therein.

The upper end surface of the tool 9 is formed at right angles to the seating side surface of its tongue, and the lower end of the wedge block 16 seats thereon and forces said tool longitudinally into firm locking engagement with said block 15, as it is forced into said recess 12, said wedge block being formed with an inwardly and downwardly inclined upper end surface to engage a similarly inclined upper end surface of the recess 12, so that as said wedge block is drawn into said recess by a screw 18 passing through a bore in the bar opening through the rear side of the bar and into the bottom of said recess with said screw engaging a screwthreaded opening in the block, with said screw extending at an inclination corresponding to the inclination of the end surface of the block, said wedge block will be wedged in between the upper end of the tool and the inclined end surface of the recess, and will securely clamp said tool endwise between said blocks 15 and 16. The head of the screw 18 is also countersunk into the rear side of the bar, leaving said side with no projections.

The longitudinal side portion or body 19 of the tool is formed at its lower end to provide the cutting edge or point 10 and this body portion is of slightly greater width than the width of the tongue 13, thus providing narrow longitudinal side shoulders 20 where said tongue meets the body, and the rib 11 on the bar is cut away opposite the recess 12 and for a short distance downward from the lower end thereof as at 21 to provide a space or recess below the cutting edge of the tool to receive the chips formed by the tool and the outer side face of the body 19, upwardly from the cutting edge is inclined inwardly to provide clearance for said edge.

By providing the described arrangement for holding the tool, said tool may be comparatively short in length thus making a saving of tool steel and the tool is of simple construction and easy to form. The blocks 15—16 provide simple and very efficient means for accurately and rigidly holding the tool firmly seated throughout its length in the general direction of the cutting thrust thereon so that there is no possibility of the tool tilting under the strain of the cut, and the cutting edge projects but little more than the depth of the cut beyond the plane of the side of the bar and is at the lower end of the body 19 so that the thrust is almost directly endwise of the tool, eliminating breakage. With this arrangement, the bar is not weakened by excessive cutting away to receive the tool, and the tool is firmly held seated, by means which forms a reinforcement for the bar and which means for each tool, is detachably held by short screws accessible from the rear side edge of the bar. The arrangement provides a very simple strong and rigid construction wherein the tool or tools and holding means are all held substantially within the cross sectional area of the bar, the cutting point only of the tool projecting from the bar and not afford any appreciable deflecting leverage upon the bar as the length of the tool extends in the direction of the length of the bar.

Obviously changes may be made in the construction and arrangement, within the scope of the appended claims, without departing from the spirit of the invention, and such changes are contemplated.

Having thus fully described my invention what I claim is:

1. A key seat forming device including a longitudinally reciprocable bar formed with a recess open at one side only and throughout its length through one side only of said bar; a tool fitting within said recess and seated at one side throughout the length thereof, upon the bottom of said recess with its opposite side projecting through the open side of said recess and formed at one end with a cutting edge; a wedge member within said recess engaging one end of said tool and an end of said recess and means extending through the bottom wall of said recess for forcing said wedge member inwardly of said recess into wedging engagement with said recess end and end of said tool to force said tool inwardly of said recess and seated upon the bottom of said recess and longitudinally toward the opposite end of said recess, one end of said wedging means being inclined inwardly of said recess.

2. A device for forming a key seat in a wall of a bore, said device including a bar having a central longitudinal rib on one side face of said bar and of a width to engage within the formed key seat, and also formed with a longitudinal recess in said face having side, end and bottom walls, a tool seated in said recess with its length extending longitudinally of said bar and recess and formed with a longitudinal portion seated throughout its length upon said bottom wall and with a portion projecting from said recess and formed with an end cutting edge, means at one end of said tool interlocking therewith to hold said end within said recess and seated against the end wall thereof, a wedge member engaging the other end of said tool and the end of said recess to urge said tool endwise toward said means, and means engaging said wedge member and lying wholly within the cross sectional area of said bar for moving said wedge member inwardly of said recess into wedging position.

3. A device for forming a key seat in a wall of a bore, said means including a longitudinally reciprocable bar formed with a recess extending longitudinally of said bar and open throughout its length through one face of said bar and formed at one end with an inwardly inclined end wall and at its opposite end with an end wall extending at right angles to its bottom wall, a tool of less overall length than the length of said recess seated in said recess along one side upon the bottom wall of the recess with the opposite side of the tool projecting beyond said face of said bar and formed at one end with a cutting edge, a wedge block in said recess between one end of said tool and said inclined end wall of said recess, means extending through an opening in said bar and into said wedge block for forcing said block into wedging position, and a locking block in said recess between the rectangular end wall thereof and the adjacent end of the tool.

4. A device for forming a key seat in a wall of a bore, said means including a bar formed with a longitudinal rib along one side face of said bar, said bar being also formed with a recess within said ribbed face, said recess extending longitudinally of said bar and cutting through said rib with said recess open through said face throughout the length of said recess; a tool having a longitudinal tongue at one side to fit within said recess and a body portion at its opposite side to project from said recess and formed with an end cutting edge, a member seated in one end of said recess in interlocking engagement with the end of said tongue, a wedge block in said recess to engage the opposite end of said tool, one end of said block being inclined inwardly of said recess and the adjacent end of said recess being similarly inclined to be engaged by said end of said block, and a screw passing through a bore in said bar opening through the side of said bar opposite that through which said recess opens, said inner end of said screw engaging a screwthreaded opening in said block and said head of said screw being countersunk in said side of said bar.

HENRY E. MORTON.